United States Patent
Barrett et al.

(10) Patent No.: US 8,010,562 B2
(45) Date of Patent: Aug. 30, 2011

(54) METHOD AND SYSTEM FOR IMPLEMENTING AND MANAGING AN ENTERPRISE IDENTITY MANAGEMENT FOR DISTRIBUTED SECURITY IN A COMPUTER SYSTEM

(75) Inventors: Michael Richard Barrett, San Francisco, CA (US); David Armes, Phoenix, AZ (US); Fred Bishop, Glendale, AZ (US); James Shelby, Phoenix, AZ (US); Elliott Glazer, Chesterfield, VA (US); Philip W. Steitz, Scottsdale, AZ (US); Stephen P. Gibbons, Tucson, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 33 days.

(21) Appl. No.: 12/692,817

(22) Filed: Jan. 25, 2010

(65) Prior Publication Data

US 2010/0121882 A1 May 13, 2010

Related U.S. Application Data

(63) Continuation of application No. 10/716,251, filed on Nov. 17, 2003, now Pat. No. 7,660,795, which is a continuation-in-part of application No. 10/334,271, filed on Dec. 31, 2002, now Pat. No. 7,143,095.

(51) Int. Cl.
*G06F 7/00* (2006.01)
*G06F 17/30* (2006.01)
(52) U.S. Cl. ........................................ 707/783; 713/200
(58) Field of Classification Search .................. None
See application file for complete search history.

(56) References Cited

U.S. PATENT DOCUMENTS

| | | | |
|---|---|---|---|
| 5,375,244 A | 12/1994 | McNair | |
| 5,544,321 A | 8/1996 | Theimer et al. | |
| 5,555,376 A | 9/1996 | Theimer et al. | |
| 5,577,169 A | 11/1996 | Prezioso | |
| 5,940,591 A | 8/1999 | Boyle et al. | |
| 5,956,634 A | 9/1999 | Otterson et al. | |
| 6,064,972 A | 5/2000 | Jankowitz et al. | |
| 6,088,804 A | 7/2000 | Hill et al. | |
| 6,163,604 A | 12/2000 | Baulier et al. | |
| 6,279,113 B1 | 8/2001 | Vaidya | |
| 6,282,658 B2 | 8/2001 | French et al. | |
| 6,289,344 B1 | 9/2001 | Braia et al. | |
| 6,289,513 B1 * | 9/2001 | Bentwich | 717/106 |

(Continued)

OTHER PUBLICATIONS

USPTO; Office Action dated Jul. 6, 2006 in U.S. Appl. No. 10/716,251.

(Continued)

*Primary Examiner* — Cam Y T Truong
(74) *Attorney, Agent, or Firm* — Snell & Wilmer L.L.P.

(57) ABSTRACT

A method and system for facilitating the management of user identities includes an ownership component, a registration component, and a servicing component. When a user first desires to access a system using the present invention, the registration component verifies the user's ownership of the underlying account by asking a variety of questions. Thereafter, when a user desires to service his account, the user may be re-queried to determine if he is attempting to access the correct information. An authentication and access component provides the functionality to access a system of the present invention. An audit component can be configured to periodically monitor the various accounts to ensure a continued linking between users and accounts.

22 Claims, 2 Drawing Sheets

U.S. PATENT DOCUMENTS

| | | |
|---|---|---|
| 6,321,338 B1 | 11/2001 | Porras et al. |
| 6,321,339 B1 | 11/2001 | French et al. |
| 6,442,696 B1 | 8/2002 | Wray et al. |
| 6,535,728 B1 * | 3/2003 | Perfit et al. .................... 455/410 |
| 7,376,603 B1 * | 5/2008 | Mayr et al. ...................... 705/35 |
| 2002/0095482 A1 | 7/2002 | Shuster |
| 2002/0107953 A1 | 8/2002 | Ontiveros et al. |
| 2002/0124187 A1 | 9/2002 | Lyle et al. |
| 2002/0133721 A1 | 9/2002 | Adjaoute |
| 2002/0138755 A1 | 9/2002 | Ko |
| 2002/0144149 A1 | 10/2002 | Hanna et al. |
| 2002/0184528 A1 | 12/2002 | Shevenell et al. |
| 2002/0184533 A1 | 12/2002 | Fox |
| 2003/0033526 A1 * | 2/2003 | French et al. ................. 713/168 |
| 2003/0037041 A1 | 2/2003 | Hertz |
| 2003/0120593 A1 | 6/2003 | Bansal et al. |
| 2003/0154406 A1 * | 8/2003 | Honarvar et al. ............. 713/201 |
| 2003/0217003 A1 * | 11/2003 | Weinflash et al. .............. 705/42 |
| 2004/0117624 A1 | 6/2004 | Brandt et al. |
| 2004/0225632 A1 * | 11/2004 | Benson et al. .................... 707/1 |
| 2005/0021476 A1 * | 1/2005 | Candella et al. ................ 705/64 |
| 2005/0108206 A1 * | 5/2005 | Lam et al. ......................... 707/3 |
| 2006/0129835 A1 * | 6/2006 | Ellmore ....................... 713/183 |

OTHER PUBLICATIONS

USPTO; Final Office Action dated Mar. 14, 2007 in U.S. Appl. No. 10/716,251.

USPTO; Office Action dated Aug. 31, 2007 in U.S. Appl. No. 10/716,251.

USPTO; Final Office Action dated Mar. 17, 2008 in U.S. Appl. No. 10/716,251.

USPTO; Advisory Action dated Jun. 26, 2008 in U.S. Appl. No. 10/716,251.

USPTO; Office Action dated Sep. 22, 2008 in U.S. Appl. No. 10/716,251.

USPTO; Office Action dated Mar. 17, 2009 in U.S. Appl. No. 10/716,251.

USPTO; Notice of Allowance dated Sep. 17, 2009 in U.S. Appl. No. 10/716,251.

* cited by examiner

METHOD AND SYSTEM FOR IMPLEMENTING AND MANAGING AN ENTERPRISE IDENTITY MANAGEMENT FOR DISTRIBUTED SECURITY IN A COMPUTER SYSTEM

CROSS-REFERENCE TO RELATED APPLICATIONS

This application is a Continuation of U.S. Ser. No. 10/716,251 entitled "Method and System for Implementing and Managing an Enterprise Identity Management for Distributed Security in a Computer System" filed on Nov. 17, 2003. The '251 application is a Continuation-in-Part of U.S. Ser. No. 10/334,271 "Method And System For Implementing And Managing An Enterprise Identity Management For Distributed Security," filed on Dec. 31, 2002 (aka U.S. Pat. No. 7,143,095 issued on Nov. 28, 2006). The entire contents of both which are hereby incorporated by this reference.

FIELD OF INVENTION

This application generally relates to computer systems, and more particularly, to a method and system for managing user identities in a computer system.

BACKGROUND OF THE INVENTION

Computer systems have evolved to the point where it is possible for a user to remotely access personal information via a computer. For example, one can monitor account balances, purchase securities, purchase goods, check the status of goods, and the like, through the use of a personal computer by using, for example, a web browser connected to the Internet.

In providing services such as those listed above, it is desirable that certain types of information be accessible only by authorized users. For example, only the account holder should be able to access information regarding his bank account, be able to perform certain activities (e.g., transfers and withdrawals) on said bank account, or be able to purchase goods using funds from said bank account.

In the past, such security has typically been provided in the form of the combination of a user id and a password. For example, an account at a bank may be protected by having a user "log in" to a banking application by providing a user id and password. However, such a security system may not provide as much security as desired. For example, if an unauthorized person were to become aware of the user id and password, the unauthorized person would then be able to access information and perform tasks that should be limited to a select group of authorized users.

There are several other problems with the above-described scenario. The association between a user ID and an account may become broken. For example, a user named John Smith may select, as a user ID, JSMITH1 and an associated password for use with a bank account. Another person named Joe Smith may select, as a user ID, JSMITH2 and an associated password for use with a different account. After a few months of non-use, Joe Smith attempts to login to his brokerage account. Not remembering his user ID, he thinks his user ID is JSMITH1. After several unsuccessful log-in attempts, he contacts a customer service representative.

In the prior art, the typical method of customer service verifying the user would be to verify ownership of the account. After verifying several pieces of information with Joe Smith (e.g., social security number, mailing address, etc.), the customer service representative is convinced that Joe Smith is who he says he is and grants him access to his brokerage account using the name JSMITH1. When John Smith later tries to login, the same scenario may occur, as John Smith is no longer able to use the JSMITH1 name that he established and contacts customer service to change the password. The result is that the JSMITH1 user ID becomes associated with both the accounts of John Smith and Joe Smith and customer service needs to intervene in order to grant the users their desired authorization level.

Thus, no sufficient system exists that accurately associates customer relationship and validates the continuing integrity of the customer relationship. In particular, the prior art is solely concerned with verifying the ownership of the account, and not verifying the relationship between the user ID and the account. It is desirable to have a more robust method of managing user identities in a computerized system.

SUMMARY OF THE INVENTION

A system of the present invention for managing identities within an enterprise includes a registration component, an ownership component, and an audit component. The registration component is configured to associate a user ID with specific accounts that are accessible via a computer system. The ownership component is configured to verify the ownership of the accounts. The audit component is configured to perform periodic checks to ensure the validity of the association between the user ID and the ownership of the accounts. The servicing component is configured to facilitate the maintenance and modification of information related to the identity.

A method of the present invention for issuing identities associated with accounts may first receive a request for the creation of an identity. The request is processed by a component configured to determine the existing methods used to authenticate users. Thereafter, using various algorithms, questions are generated that can be used to verify the identity of the user. Answering the questions correctly is indicative of the fact that the user is who he says he is, therefore the identity can be issued.

In addition, each transaction performed under the user identity is aggregated. Positive weighting can be assigned to successful transactions that are indicative of an ownership of the underlying account, while negative weighting can be assigned to unsuccessful transactions. Thereafter, the weightings can be analyzed to verify that the user identity is being used by the true owner of the underlying account.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system of the present invention.

A system of the present invention may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor, and a plurality of databases, said databases including client data, merchant data, financial institution data and/or like data that could be used in association with the present invention. As those skilled in the art will appreciate, a user's computer will typically include an operating system (e.g., Windows NT, 95/98/2000, Linux, Solaris, etc.) as well as various conventional support software and drivers typically associated with computers. A user's computer may be in a home or business environment with access to a network. In one exemplary embodiment, access is through the Internet through a commercially available web-browser software package. In another exemplary embodiment, access to the system is through a customer service representative, with a user in contact with the customer service representative telephonically. The customer service representative accesses the system through a variety of different manners, including through the Internet and through a restricted-access Intranet.

The term "database" may refer to any type of data organizing mechanism, such as relational databases, hierarchical databases, object-oriented databases, spreadsheets, and/or the like. Common database products that may be used to implement the databases include DB2 by IBM (White Plains, N.Y.), any of the database products available from Oracle Corporation (Redwood Shores, Calif.), Microsoft Access, Microsoft Excel, or SQL Server by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example. It should also be understood that a system of the present invention is not limited to a physical implementation of a single repository of information. It is also possible to have multiple repositories of information. The multiple repositories may be linked together in a variety of different manners to create a single logical repository of information.

A data set annotation may also be used for certain types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one preferred embodiment, the header or trailer is not stored on the transaction device along with the associated issuer-owned data but instead the appropriate action may be taken by providing to the transaction instrument user at the stand-alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Figure 1:
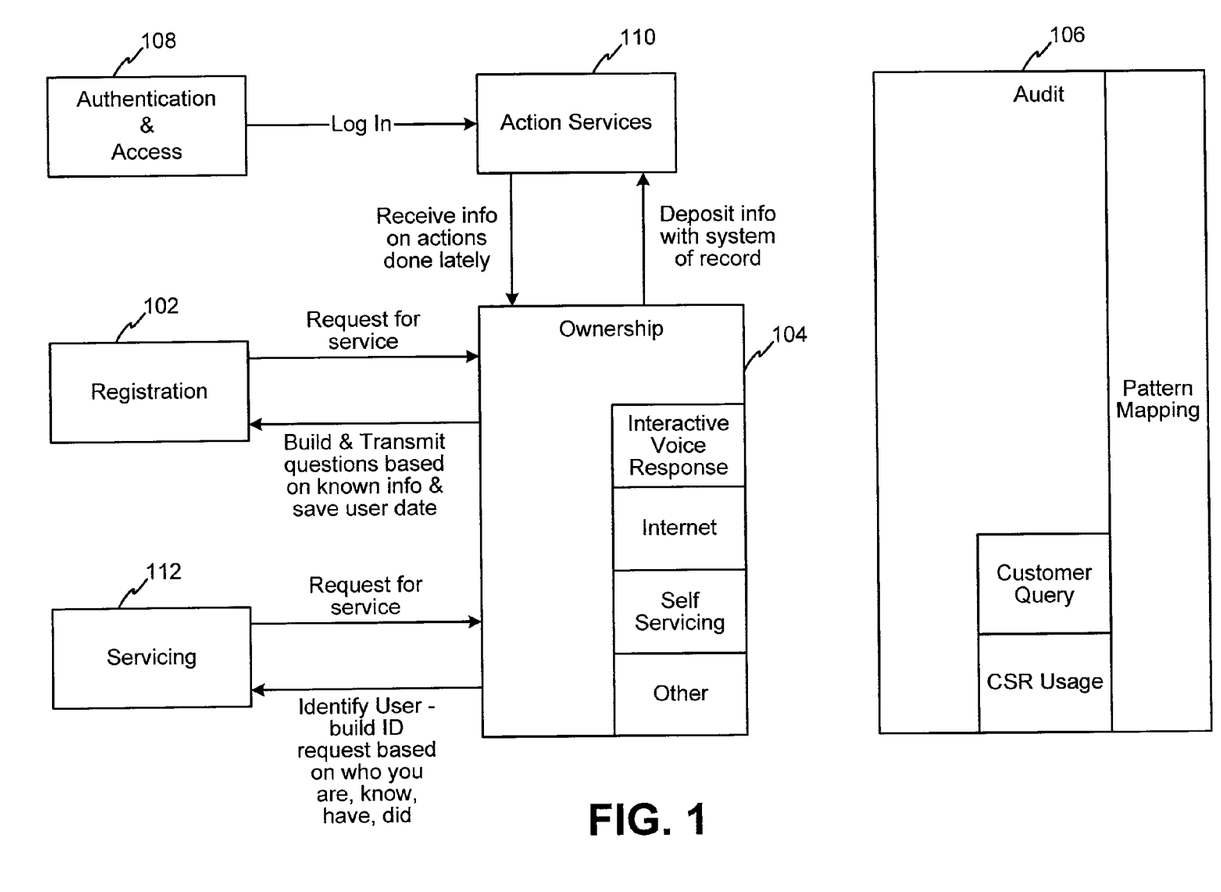
FIG. 1 presents a block diagram overview of an embodiment of the present invention.

A block diagram illustrating an embodiment of the present invention is illustrated in FIG. 1. A system of the present invention contains, in one embodiment, a registration component (102), an ownership component (104), and an audit component (106). Registration component 102 is configured to facilitate registration of new users and establishing a relationship between the user ID and the account or accounts related to the user ID. Ownership component 104 is configured to facilitate defining the criteria used to verify the ownership of the account. Audit component 106 is configured to facilitate validating the relationships between an account and a user ID on a periodic basis.

A user initiates a registration process using customer registration component 102. Registration is the process of granting access to various services to a user. For example, one user may wish to be able to track stocks and mutual funds. Another user may wish to perform on-line banking services, such as transfers of money and payment of bills. A different user may wish to access his credit card account to view transactions and pay bills. Other users may wish to perform more than one of the above tasks.

Registration component 102 is in communication with ownership component 104. When a user requests a registration, ownership component 104 is used to determine if the user is actually the owner of the account he wishes to access. Such a process may occur by asking various questions of the user, which only the actual owner of the account would be able to answer (as discussed in more detail below). Once the user sufficiently proves ownership-to-ownership component 104 the user is granted a means of accessing the records he desires. In one embodiment, the access is in the form of a user ID and password that is issued to the user. In another embodiment, biometric data (such as a retina scan, fingerprint, or the like) is taken of the user and the biometric data is associated with the user. In such a situation, the appropriate biometric reader (e.g., fingerprint scanner, retinal scanner, or the like), would be issued to the user prior to the registration process is completed.

When a user attempts to access his information, authentication and access component 108 is used to verify the user. In one embodiment, the user will be prompted to enter his user ID and password. In another embodiment, the user is asked to supply biometric data, which is compared to the biometric data that was supplied at the time of the registration. The action services component 110 communicates with the authentication and access component 108 and communicates with the ownership component 104 regarding actions performed lately and information of record, for example.

In establishing a user ID, it is preferable that a set of criteria be pre-established to facilitate associating a user ID to an account. In the context of financial services, for example, a financial service provider typically has a large set of data related to each account. In an instance where a user wishes to establish a user ID, registration component 102 has access to subsets of that data through ownership component 104, allowing the establishment of a relationship between a user ID and all accounts owned by the user. For example, if a user wishes to access his bank account on-line, then during the registration process, registration component 102 and ownership component 104 can determine, for example, that the user also owns a brokerage account and a credit account from the same provider of the bank account. Thereafter, an appropriate entry can be made in ownership component 104, noting the relationships between the user ID and the various accounts. Thus, the user ID established by registration component 102 is associated with the bank account, the brokerage account, and the credit account.

Ownership component 104 is configured to establish rules to help ensure that adequate ownership information is obtained from the user during authentication. For example, if a user wishes to associate a user ID to a brokerage account, ownership component 104 is configured to determine criteria (or include a database of predetermined criteria which will be required for certain access requests) to verify that the identity of the person requesting the ID is the owner of the brokerage account. The required criteria may be pre-established, determined based on past access history, determined based on consumer profile data, randomly determined, changed after a certain number of requests and/or the like. Moreover, a user wishing to associate a user ID to another type of account with less need for security (e.g., the ability to check the balance of a credit account) may not utilize the same criteria. For example, access to a brokerage account may require that the user input a name, social security number, date of birth, and verify various bits of information. But access to a balance checking feature may only require the user to know the name, address, and account number associated with the account. Furthermore, access to a securities tracking feature in which no transfer of funds is available, may require even fewer security features.

In addition, this hierarchical registration process can be used to build a relationship over time. For example, a customer may register with only the desire to track securities. As time passes, the user decides to register a credit card. Because some of the user's information is already stored by the system in a database, only the additional information needed to access the credit card needs to be obtained from the user. As the user desires more features with higher security, the user is asked more questions to verify the user's identity, without the need to re-ask the previous questions.

For a business organization with multiple business lines, ownership component 104 may be configured to evaluate each business line to determine the authentication process each business line uses. Thereafter, ownership component 104 is configured to use an algorithm to generate or acquire a set of questions or criteria that can be used by registration component 102 to verify that the requesting user is the owner of the account.

Servicing an account may also be an important aspect of an embodiment of the present invention. Occasionally, a user may need to modify personal information associated with the user. For example, a user may wish to submit a change of address. In other situations, a user may require the help of a customer service representative ("CSR") to access his account. Such a situation may occur if a user forgets his user ID or password. In such situations, servicing component 112 is activated and can interact with the Self Servicing component of the ownership component 104.

Figure 2:
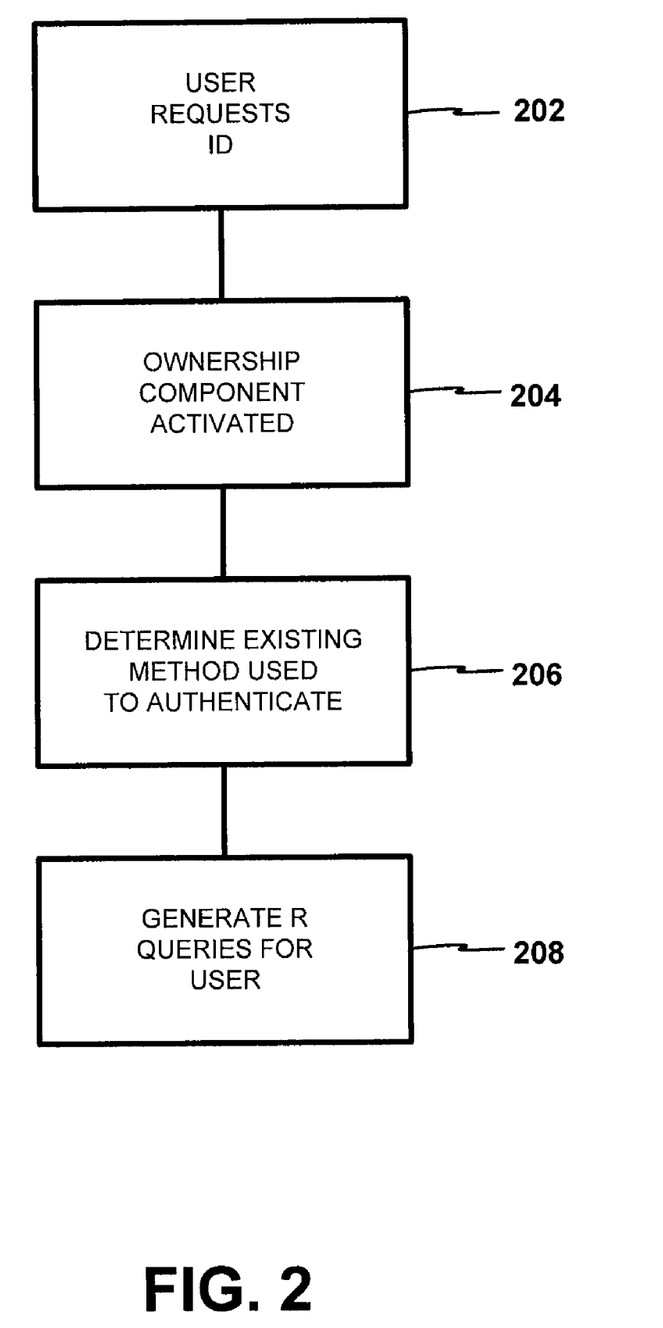
FIG. 2 is a flow chart illustrating an exemplary process by which a user creates a user ID.

With respect to FIG. 2, an exemplary process by which a user establishes a user ID with a business comprising multiple business lines is illustrated. A user accesses a business system and requests a user ID (step 202). Such a request activates registration component 102. Ownership component 104 determines which accounts from the various businesses are to be associated with the user ID. In one embodiment, the user selects the various business lines he wishes to be associated with the user ID. Such a selection can be done by first displaying the eligible business lines, then allowing the user to select (via a graphical user interface) which business lines he wishes to associate with the user ID. Thereafter, ownership component 104 is activated (step 204). Ownership component 104 is configured to determine the various schemes used by the selected business lines to authenticate users (step 206). The various authentication processes are joined in a rules-based algorithm to generate (or acquire from a pre-existing database) specific questions to be asked of the user attempting to obtain a user ID (step 208). In this way, one or more rules-based queries or R queries are generated to be asked of the user. The user supplies the answers to the questions in order further verify his identity as the owner of the account he is trying to access.

The generating and answering of questions may be a dynamic and interactive process. For example, the user can be asked questions of his profile. Subsequent questions may be generated based upon the answer to previous questions. A certain number of correct (or substantially correct) answers may result in a confirmation of the identity of the user. An incorrect answer may lead to further questions in an attempt to confirm the identity of the user. In addition, a question being asked may require physical possession of an object. For example, for a credit card account, a user may be asked to supply information located on the card or even be asked to swipe the magnetic stripe of the card into a reader, should a card reader be available. A user may also be asked to activate or transmit information (e.g., from a smart chip, transponder or PDA) as confirmation of the user's identity.

Furthermore, biometric information may be used in addition to or as an alternative to issuing a user a User ID and password combination to access certain information. Biometric information may include, for example, fingerprints, retina scans, and the like.

As discussed above, the prior art focused on verifying the ownership of the underlying account, ignoring the relationship between a particular user ID/password and an account. The servicing component 112 minimizes or eliminates these problems by verifying both of the above aspects. A flowchart illustrating an exemplary operation of the servicing component 112 is presented in FIG. 3. Questions are generated based on information stored in ownership component 104 (step 302). The questions being generated are based on the user's assigned level of access. As discussed above, different types of accounts may require different levels of access. A user with only access to tracking features may be required to answer fewer questions than a user with access to money transfer capabilities. The questions being asked may be based on who the user is, what the user knows, what the user has, and what the user has done in the past. For example, who the user is includes information as to the user's identity, such as the user's name, address, and social security number. What the user knows includes information that only the true user would know. Such information may include the user's mother's maiden name or date of birth, the year of high school graduation, name of a favorite pet, and the like. What the user has may include information contained on a credit card, such as the CID or CVV2 number, or biometric information. What the user has done may include questions regarding previous tasks performed by the user. For example, the user may be asked where a credit card was last used or an estimate of the last transaction amount.

After the user correctly answers the generated questions, servicing component 112 verifies the user and the CSR or the user is able to change various information regarding his card (step 304).

Even though a set of relationships is robustly validated at the time of the creation of the relationships, the set of relationships can deteriorate over time, for a number of reasons. For example, account expiration, account re-issuance (e.g., due to a stolen credit card), change in marital status (resulting in a no longer valid card that was previously issued to a spouse), change in address, and the like. In order to maintain an accurate management of identities, it is desirable to periodically monitor the relationships.

An embodiment of audit component 106 of the present invention utilizes a mathematical weighting function that assigns values to specific interactions captured by the system. Interactions that serve to confirm the identity of the user are assigned positive values. Examples of these types of interactions include the payment of balances, the receipt of merchandise, and similar transactions where it is unlikely that an unauthorized user performed the transaction. Interactions that serve to undermine the identity of the user are assigned negative values. Examples of such interactions include non-payment of bills, requests to receive merchandise at alternate locations, or failed attempts to enter in a user id/password, or biometric information.

Additionally, certain interactions may be weighted in aggregate form. In other words, some combinations of events may have relationships with each other. For example, a series of identity-undermining events may have an aggregate negative weighting that exceeds the individual negative weightings described above. Aggregated behaviors may also include usage behaviors that can be captured as patterns using, for example, conventional pattern matching algorithms. Each usage can be compared to a typical usage pattern. Typical usage may include the typical tasks performed by the user, the location of the user when accessing the system electronically (which may be determined, for example, via the IP address or addresses from which they typically connect), and usage of the underlying account. For example, if the account is being used in multiple cities hours apart, a sign of fraud may be present. This pattern data may be updated at regular intervals. For example, each time the user accesses the system, a similarity score can be computed that indicates the similarity of the transaction to previous transactions. Therefore, each usage of the system establishes a usage history for the user. Thus, previous usage can be logged and compared to each subsequent usage.

Another embodiment of the present invention records various information about a user each time the user accesses the computer system. Examples of the information collected include the IP address from which the user accesses the computer system; the browser being used; the transactions performed on the computer system; the time of the access; and the like. This information may be collected each time the user accesses the computer system. At each subsequent access to the computer system, such information can be compared to connection information previously collected. If the information is very similar, the user can continue to perform transactions. However, if the information is different, more information may be requested from the user to confirm the user's identity.

An embodiment of the present invention may also increase the security of the system by asking specific questions that only a particular person would know the answer to, prior to allowing the user to perform certain transactions. For example, additional questions may be asked when a user attempts to transfer funds, obtain a cash advance, or other such transactions that have been determined to require more security to perform. Such questions are more specific and would only be known to the cardholder, and not to those who, for example, steal a credit card. Such a question may include queries regarding previous purchases, questions regarding associated accounts, and the like, in addition to questions regarding the account holder, such as address, social security number, date of birth, somewhere you are, something you've done, and the like. The questions asked can be determined algorithmically using various methods. Correct answers to such questions not only allow the user to perform the requested tasks, but also increase the above-described certainty measure of the user.

Such questions may be asked telephonically. In such a case, it may be desirable to avoid having a human CSR who may possibly be able to steal such information. In such a situation, a voice recognition unit ("VRU"), or interactive voice response ("IVR") may be used to obtain the answers from the users and translate the answers into a computer-readable form, without the need for additional human assistance.

In addition, when a CSR is involved in a servicing process, each of the CSR's activities may be tracked. Such a tracking system can be integrated into a fraud detection system. Such a process can be used to determine if a CSR is involved in identity-theft.

In another embodiment, the aggregation of positive and negative scores can be changed into a probability score, using a variety of different algorithms. For example, a certain number of positive scores combined with a number of negative scores results in a probability score of 95%, indicating a 95% likelihood that the user is who he says he is. The probability score can be combined with the hierarchical scheme of registrations to require different probability scores to access different systems. For example, a probability of 80% may be sufficient to allow access to a securities tracking system, but a probability of 99.99% may be required to allow trading of securities.

Another aspect of the audit module is a periodic self-audit of information. To ensure that proper data exists for each user, an audit can be conducted periodically. Such an audit may consist of querying a user as to the user's contact information. The user can confirm or update the information. To ensure that the user is who he says he is, the user may also be required to answer questions, such as those described in more detail above.

Such a task ensures that accurate information regarding each user is stored. For example, if a user changes residence, such a fact can be determined by the periodic audit. In one embodiment, the periodic audit may occur annually.

It can thus be seen that the problems of the prior art can be eliminated by an embodiment of the present invention. For example, it would not be possible for the owner of user ID JSMITH2 to obtain access to the user ID JSMITH1, as the servicing component in conjunction with the ownership component would determine that, although he is the owner of an account, he is not the owner of the account associated with the JSMITH1 user ID.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, Mac OS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank-computing center might maintain a permanent connection to the Internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

These computer program instructions may also be stored in a computer-readable memory such as a computer readable storage medium that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

We claim:

1. A system comprising:
    a processor for facilitating management of user identities;
    a non-transitory memory communicating with the processor,
    the non-transitory memory having instructions stored thereon that, in response to execution by the processor, cause the processor to perform operations comprising:
        facilitating monitoring, by the processor, an account and an identity to verify an integrity of a relationship;
        determining, by the processor, a usage history of the identity based on a transaction being deemed a successful confirmation or unsuccessful confirmation of the relationship between the identity and the account;
        assigning, by the processor, a positive weight for a successful transaction by the identity associated with the account;
        assigning, by the processor, a negative weight for an unsuccessful transaction by the identity associated with the account;
        assigning, by the processor, a negative weight for a particular series of unsuccessful transactions by the identity associated with the account that exceeds an aggregate of individual negative weights of unsuccessful transactions that comprise the particular series of unsuccessful transactions by the identity associated with the account;
        aggregating, by the processor, the positive and negative weights to determine usage history of the identity of the user;
        determining, by the processor, a likelihood a claimed identity is an owner of the account by converting the aggregation of positive and negative weights to a probability score;
        facilitating, by the processor, periodic confirmation of ownership information from the user;
        facilitating maintaining and modifying, by the processor and based on the aggregated positive and negative weights, information relating to the identity; and
        allowing or denying, by the processor and using the likelihood, along with a hierarchal scheme of registration, access to the user of different systems associated with the account.

2. The system of claim 1, further configured to facilitate periodic confirmation of ownership information from the user.

3. The system of claim 1, further configured to facilitate periodic confirmation of the identity information.

4. The system of claim 1, wherein the information from the users comprises biometric information.

5. The system of claim 1, further configured to determine the likelihood a claimed identity is an owner of the account by converting the aggregation of positive and negative weights to a probability score.

6. The system of claim 1, further comprising a servicing component, wherein the servicing component facilitates maintaining and modifying, based on the aggregated positive and negative weights, information relating to the identity and using the likelihood, along with the hierarchal scheme of registration, to allow or deny access to the user of different systems associated with the account.

7. The system of claim 6, wherein the servicing component is further configured to be operated by users.

8. The system of claim 6, wherein the servicing component is further configured to be operated by one or more customer service representatives.

9. The system of claim 1, further comprising an ownership component for facilitating verification of an ownership of an account.

10. The system of claim 1, further comprising an ownership component for facilitating relating the ownership to the identity.

11. The system of claim 1, further comprising an ownership component for facilitating confirming the ownership of a user identifier (id), analyzing ownership data and generating questions to be asked of the user to verify the identity of the user.

12. The system of claim 1, further comprising an ownership component to facilitate confirming the ownership of at least one of a user identifier or an account.

13. The system of claim 1, further comprising an ownership component for analyzing ownership data and generating questions to be asked of a user to verify the identity of the user.

14. The system of claim 1, further comprising a registration component for facilitating gathering information from users and establishing a relationship between the user and the identity.

15. The system of claim 1, further comprising an ownership component for facilitating confirming the ownership of a user identifier (id), analyzing ownership data and generating questions to be asked of the user to identify the user identifier (id) of said user.

16. The system of claim 1, further comprising an ownership component for facilitating confirming the ownership of a user identifier (id), analyzing ownership data, generating questions to be asked of the user to verify the identity of the user and providing new access credentials to the user's account.

17. A method for facilitating management of user identities, the method comprising:
    facilitating monitoring, by a computer-based system for the facilitating management of the user identities, an account and an identity to verify an integrity of a relationship between a user and the identity;
    determining, by the computer based system, a usage history of the identity based on a transaction being deemed a successful confirmation or unsuccessful confirmation of the relationship between the identity and the account;

assigning, by the computer-based system, a positive weight for a successful transaction by the identity associated with the account;

assigning, by the computer-based system, a negative weight for an unsuccessful transaction by the identity associated with the account;

assigning, by the computer-based system, a negative weight for a particular series of unsuccessful transactions by the identity associated with the account that exceeds an aggregate of individual negative weights of unsuccessful transactions that comprise the particular series of unsuccessful transactions by the identity associated with the account;

aggregating, by the computer-based system, the positive weights and negative weights to determine usage history of the identity of the user;

determining, by the computer-based system, a likelihood a claimed identity is an owner of the account by converting the aggregation of positive weights and negative weights to a probability score;

facilitating, by the computer-based system, periodic confirmation of ownership information from the user;

maintaining and modifying, by the computer-based system and based on the aggregated positive weights and negative weights, information relating to the identity; and allowing or denying, by the computer-based system and using the likelihood along with a hierarchal scheme of registration, access to the user of different systems associated with the account.

18. The method of claim 17, further comprising establishing a relationship between the user and the identity.

19. The method of claim 17, further comprising facilitating monitoring of the account and the identity to verify an integrity of the relationship, including determining a usage history of the identity based on at least one transaction deemed a successful or unsuccessful confirmation of the relationship between the identity and the account.

20. The method of claim 17, further comprising facilitating verification of an ownership of the account and facilitating relating the ownership to the identity.

21. The method of claim 17, further comprising facilitating, using an ownership component of the components, verification of an ownership of the account and facilitating relating the ownership to the identity, wherein the ownership component further facilitates confirming the ownership of a user identifier (id), analyzes ownership data and generates questions to be asked of the user to verify the identity of the user.

22. A non-transitory computer-readable storage medium having stored thereon a plurality of instructions, when executed by a computer-based system for facilitating management of user identities, perform operations comprising:

facilitating monitoring, by the computer-based system, an account and an identity to verify an integrity of a relationship between a user and the identity;

determining, by the computer-based system, a usage history of the identity based on a transaction being deemed a successful confirmation or unsuccessful confirmation of the relationship between the identity and the account;

assigning, by the computer-based system, a positive weight for a successful transaction by the identity associated with the account;

assigning, by the computer-based system, a negative weight for an unsuccessful transaction by the identity associated with the account;

assigning, by the computer-based system, a negative weight for a particular series of unsuccessful transactions by the identity associated with the account that exceeds an aggregate of individual negative weights of unsuccessful transactions that comprise the particular series of unsuccessful transactions by the identity associated with the account;

aggregating, by the computer-based system, the positive weights and negative weights to determine usage history of the identity of the user;

determining, by the computer-based system, a likelihood a claimed identity is an owner of the account by converting the aggregation of positive weights and negative weights to a probability score;

facilitating, by the computer-based system, periodic confirmation of ownership information from the user;

maintaining and modifying, by the computer-based system and based on the aggregated positive weights and negative weights, information relating to the identity; and allowing or denying, by the computer-based system and using the likelihood along with a hierarchal scheme of registration, access to the user of different systems associated with the account.

* * * * *